US009727475B2

(12) United States Patent
Pal et al.

(10) Patent No.: US 9,727,475 B2
(45) Date of Patent: Aug. 8, 2017

(54) METHOD AND APPARATUS FOR DISTRIBUTED SNOOP FILTERING

(71) Applicant: Intel Corporation, Santa Clara, CA (US)

(72) Inventors: Rahul Pal, Bangalore (IN); Ishwar Agarwal, Hillsboro, OR (US); Yen-Cheng Liu, Portland, OR (US); Joseph Nuzman, Haifa (IL); Ashok Jagannathan, Bangalore (IN); Bahaa Fahim, San Jose, CA (US); Nithiyanandan Bashyam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 14/497,740

(22) Filed: Sep. 26, 2014

(65) Prior Publication Data
US 2016/0092366 A1    Mar. 31, 2016

(51) Int. Cl.
*G06F 12/00* (2006.01)
*G06F 12/0875* (2016.01)
*G06F 12/0831* (2016.01)

(52) U.S. Cl.
CPC ...... *G06F 12/0875* (2013.01); *G06F 12/0831* (2013.01); *G06F 2212/452* (2013.01)

(58) Field of Classification Search
None
See application file for complete search history.

(56) References Cited

U.S. PATENT DOCUMENTS

| 6,195,729 | B1 * | 2/2001 | Arimilli | G06F 12/0811 711/119 |
| 2011/0161595 | A1 * | 6/2011 | Fang | G06F 1/3225 711/128 |
| 2014/0052905 | A1 * | 2/2014 | Lih | G06F 12/0831 711/105 |

* cited by examiner

Primary Examiner — Brian Peugh
Assistant Examiner — Edmund Kwong
(74) Attorney, Agent, or Firm — Nicholson De Vos Webster & Elliott LLP

(57) ABSTRACT

An apparatus and method are described for distributed snoop filtering. For example, one embodiment of a processor comprises: a plurality of cores to execute instructions and process data; first snoop logic to track a first plurality of cache lines stored in a mid-level cache ("MLC") accessible by one or more of the cores, the first snoop logic to allocate entries for cache lines stored in the MLC and to deallocate entries for cache lines evicted from the MLC, wherein at least some of the cache lines evicted from the MLC are retained in a level 1 (L1) cache; and second snoop logic to track a second plurality of cache lines stored in a non-inclusive last level cache (NI LLC), the second snoop logic to allocate entries in the NI LLC for cache lines evicted from the MLC and to deallocate entries for cache lines stored in the MLC, wherein the second snoop logic is to store and maintain a first set of core valid bits to identify cores containing copies of the cache lines stored in the NI LLC.

22 Claims, 17 Drawing Sheets

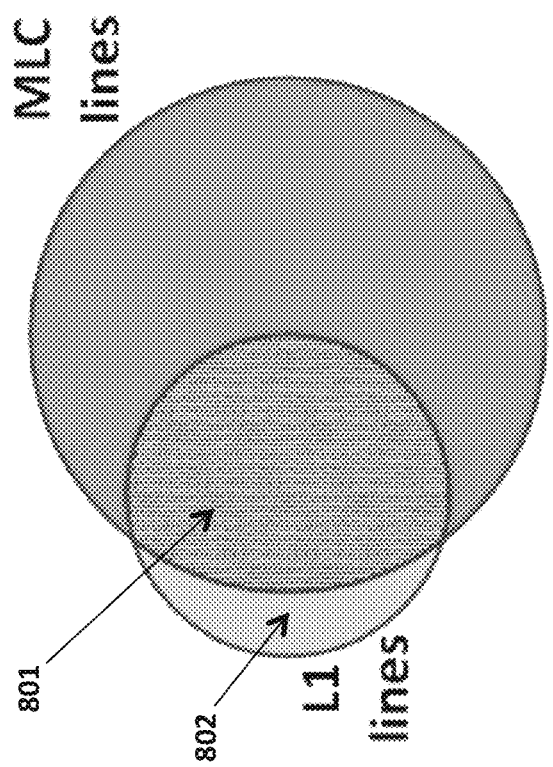

METHOD AND APPARATUS FOR DISTRIBUTED SNOOP FILTERING

BACKGROUND

Field of the Invention

This invention relates generally to the field of computer processors. More particularly, the invention relates to a method and apparatus for distributed snoop filtering.

Description of the Related Art

Modern microprocessors use a multi-level cache hierarchy. The cache size typically grows larger and the cache serves more hardware threads further up the hierarchy. Current processors have been using three levels of cache. The last level cache (LLC) in this hierarchy (also known as the Level-3 (L3) cache) services all the cores within the processor. The two lower levels of the cache, the L1 cache and the mid-level cache (MLC) (also known as the Level-2 (L2) cache), lie inside each core.

As used herein an "inclusive" cache arrangement is one in which the same cache are stored at multiple cache levels in the hierarchy. For example, in an inclusive arrangement, all cache lines stored in a L1 cache are also stored in the MLC and/or MLC. In an "exclusive" cache arrangement, a cache line is stored exclusively in only one cache level in the hierarchy (e.g., the L1 but not the MLC or LLC).

In some current architectures, the MLC is neither strictly inclusive nor strictly exclusive of the L1. As shown in FIG. 8 one subset 801 of the cache lines in the L1 can also be found in the MLC, but another subset 802 of cache lines in the L1 are found exclusively in the L1. In some prior processor architectures, the LLC was fully inclusive of the inner caches (e.g., the MLC and L1); it filtered cache snoops directed to the inner caches by also storing information about which cores might have the cache line along with data for each cache line.

A strictly inclusive cache makes it expensive to have large lower (core) caches, and is thus restrictive on their size. It also reduces the total available caching space due to duplicate caching of lines in higher and lower hierarchies of caches. Future processors, particularly in the server world, are thus shifting towards implementing non-inclusive LLCs. The Xeon server strategy for creating a non-inclusive LLC involves making LLC a victim cache for all core MLCs, referred to herein as "non-inclusive LLC" or "NI LLC."

BRIEF DESCRIPTION OF THE DRAWINGS

A better understanding of the present invention can be obtained from the following detailed description in conjunction with the following drawings, in which:

FIG. 8 illustrates subsets of cache lines found in the L1 cache and in the MLC and overlap between the two;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
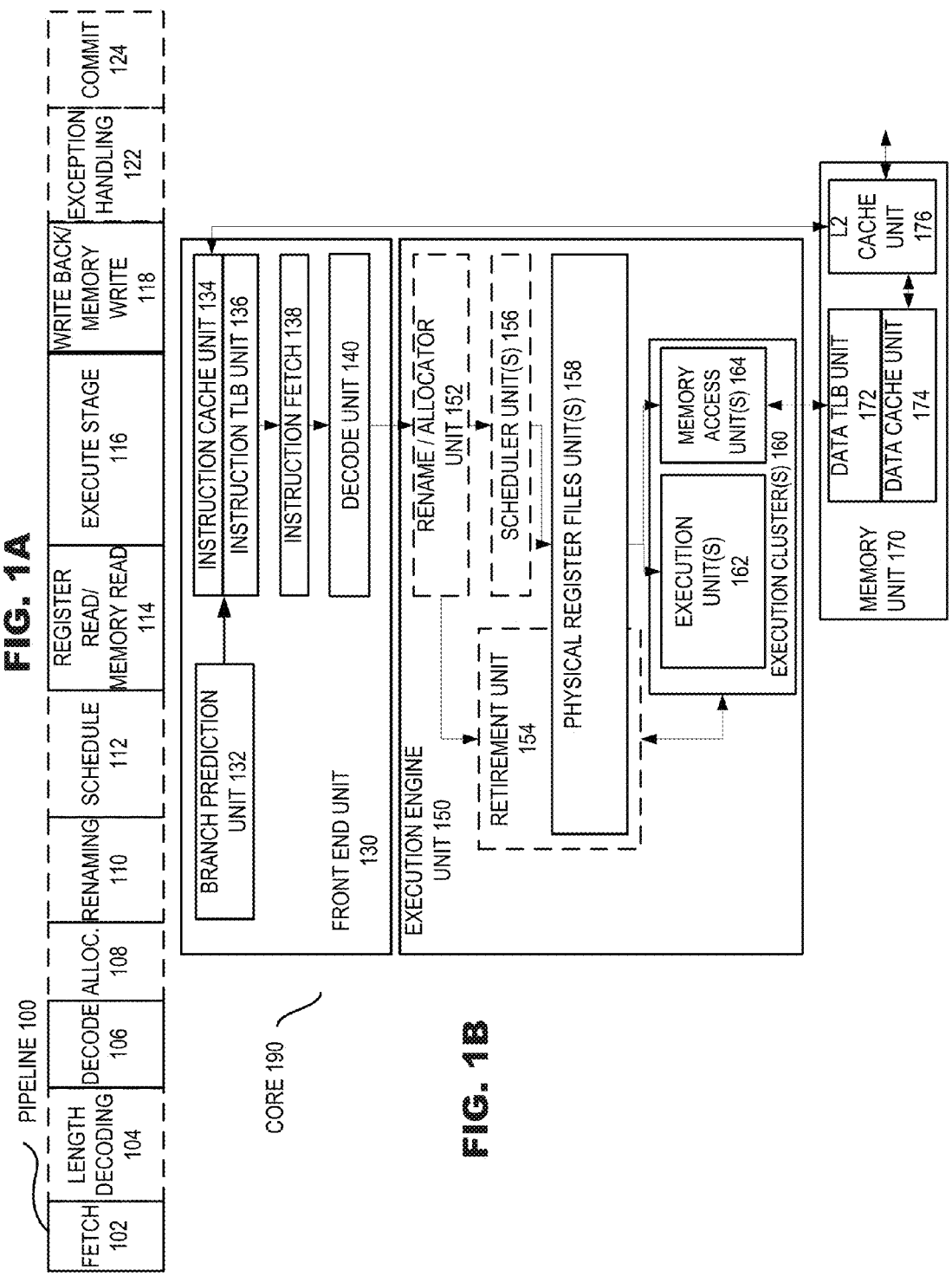
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a writeback/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
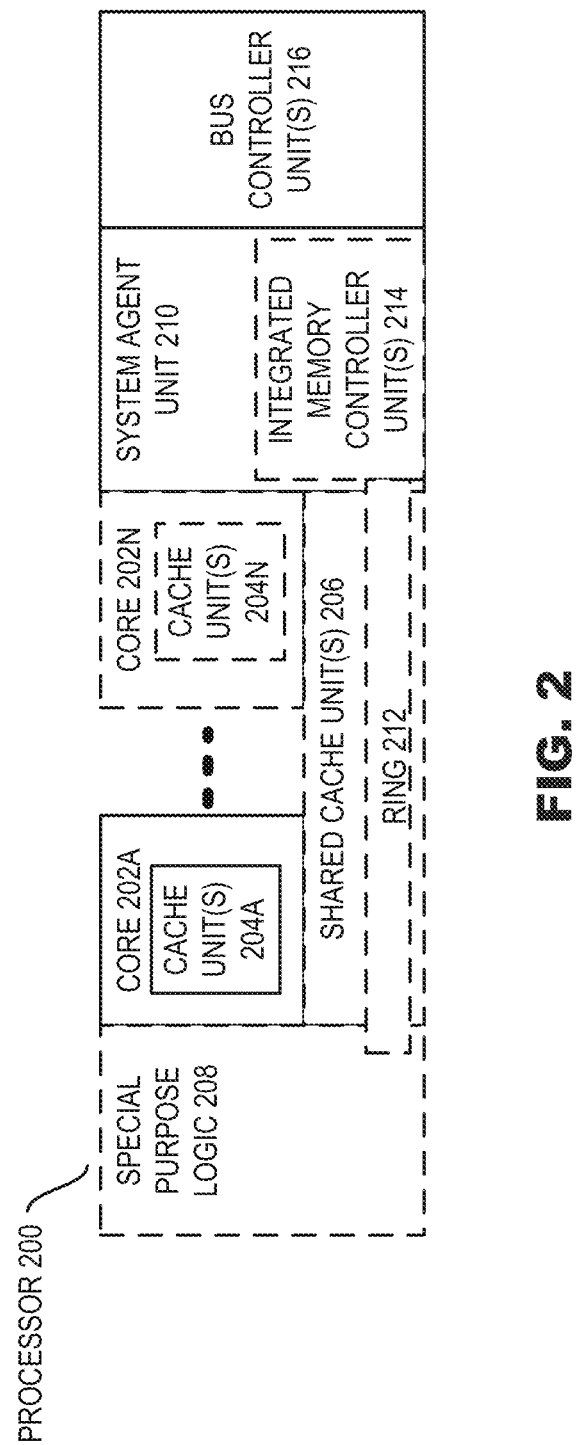
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
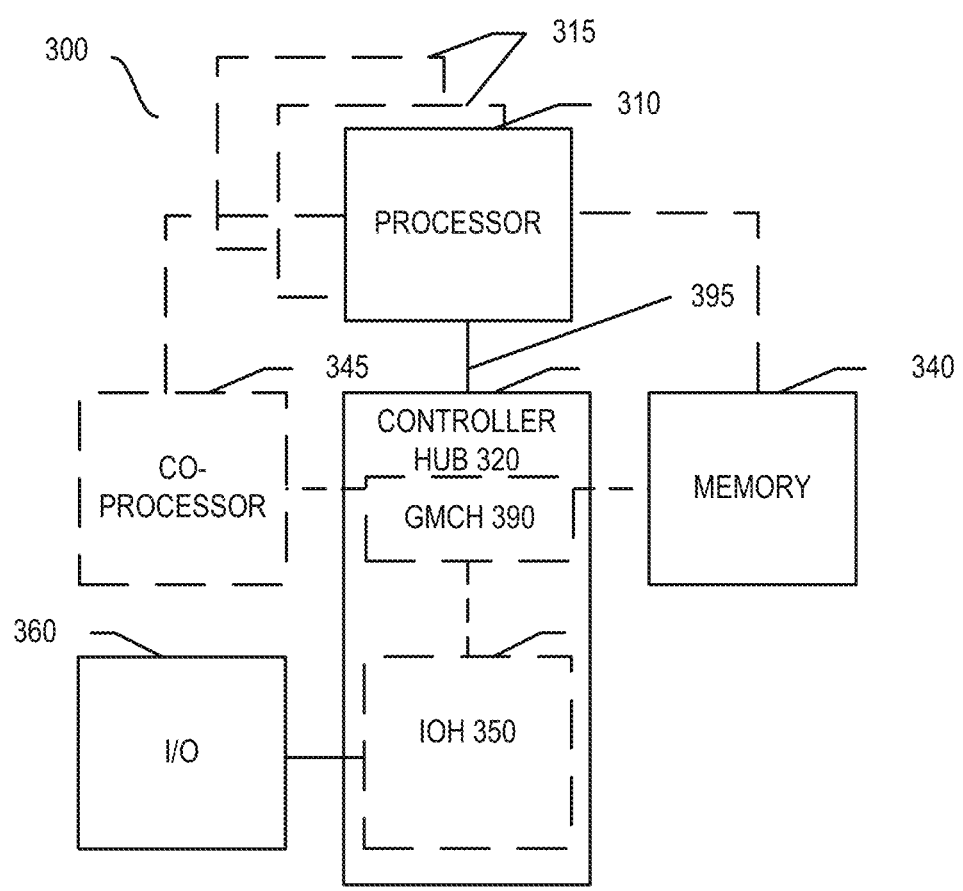
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
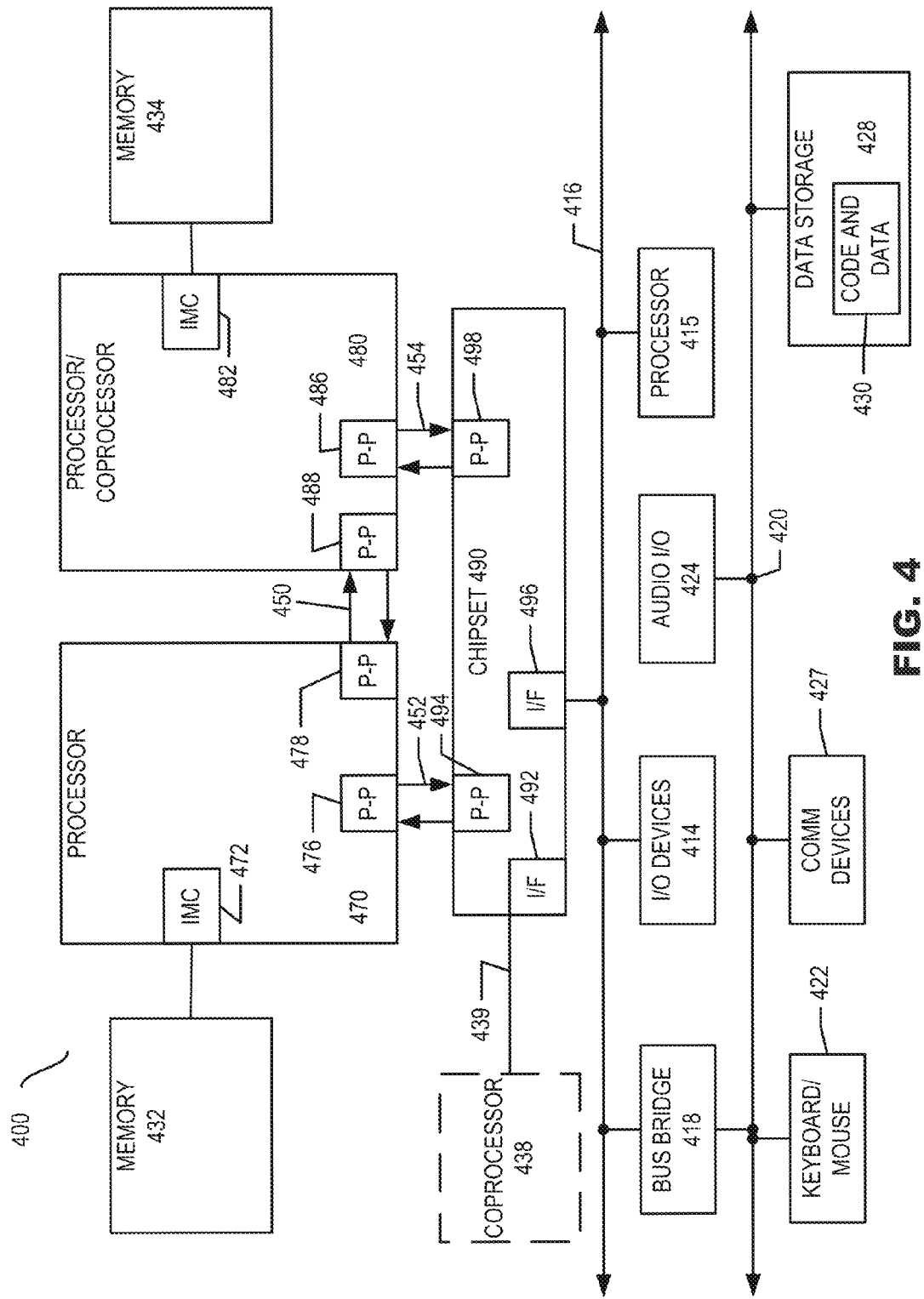
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
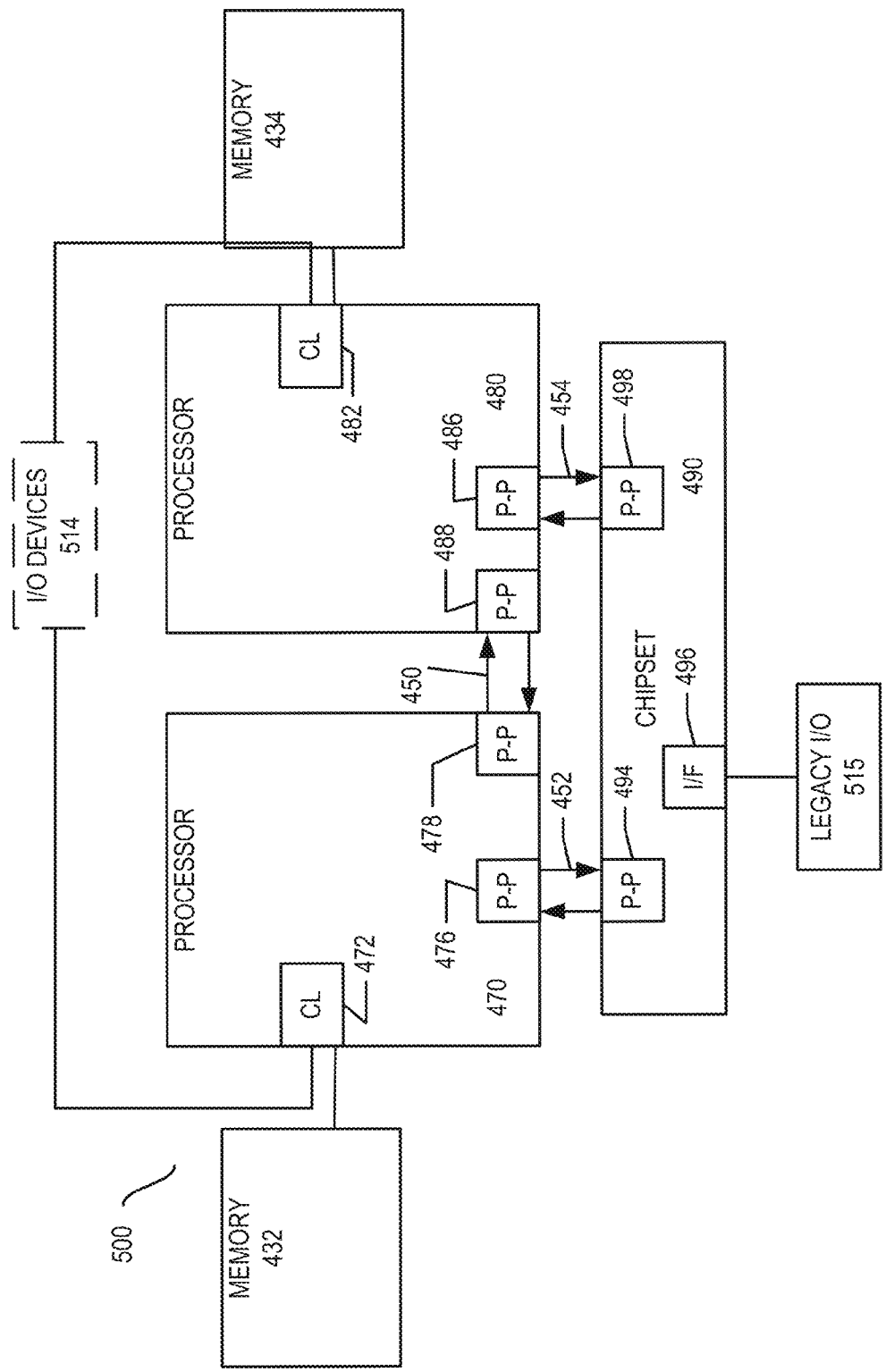
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
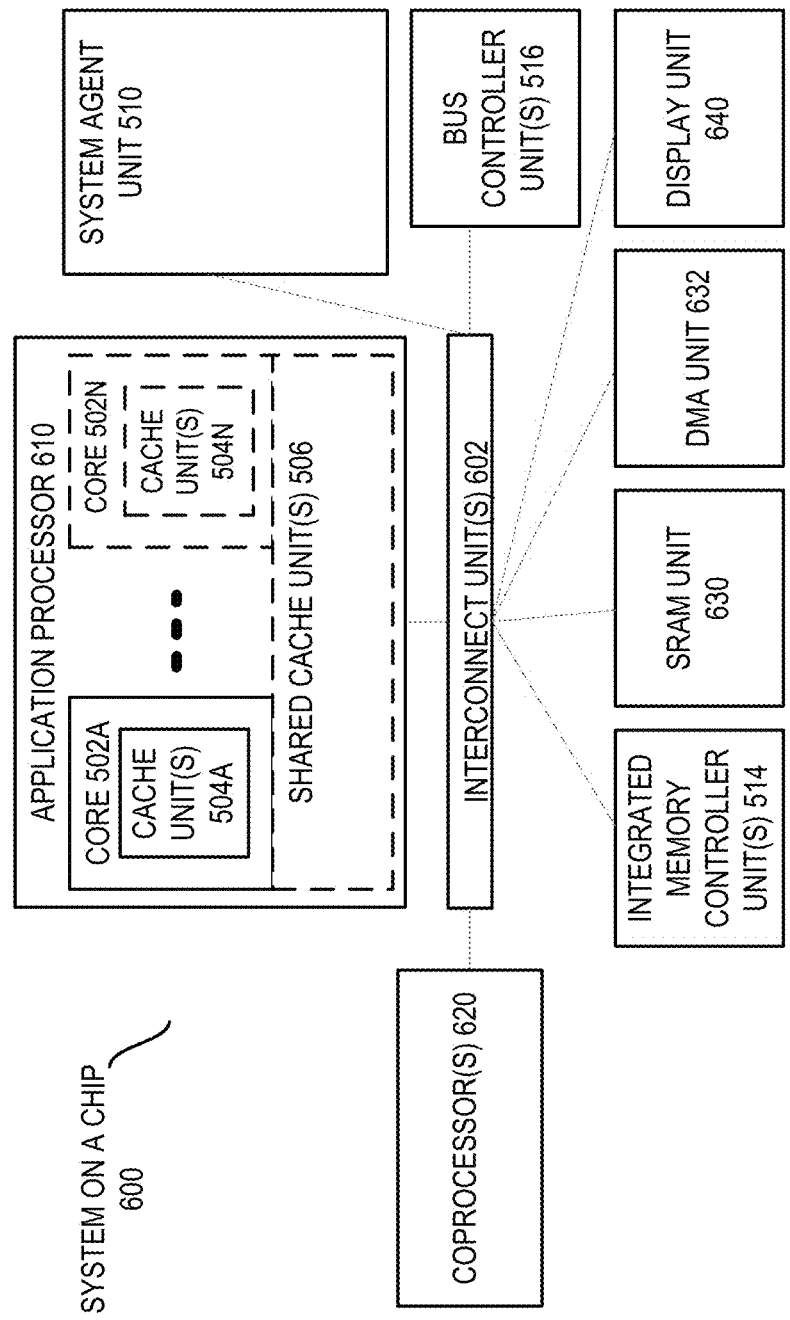
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
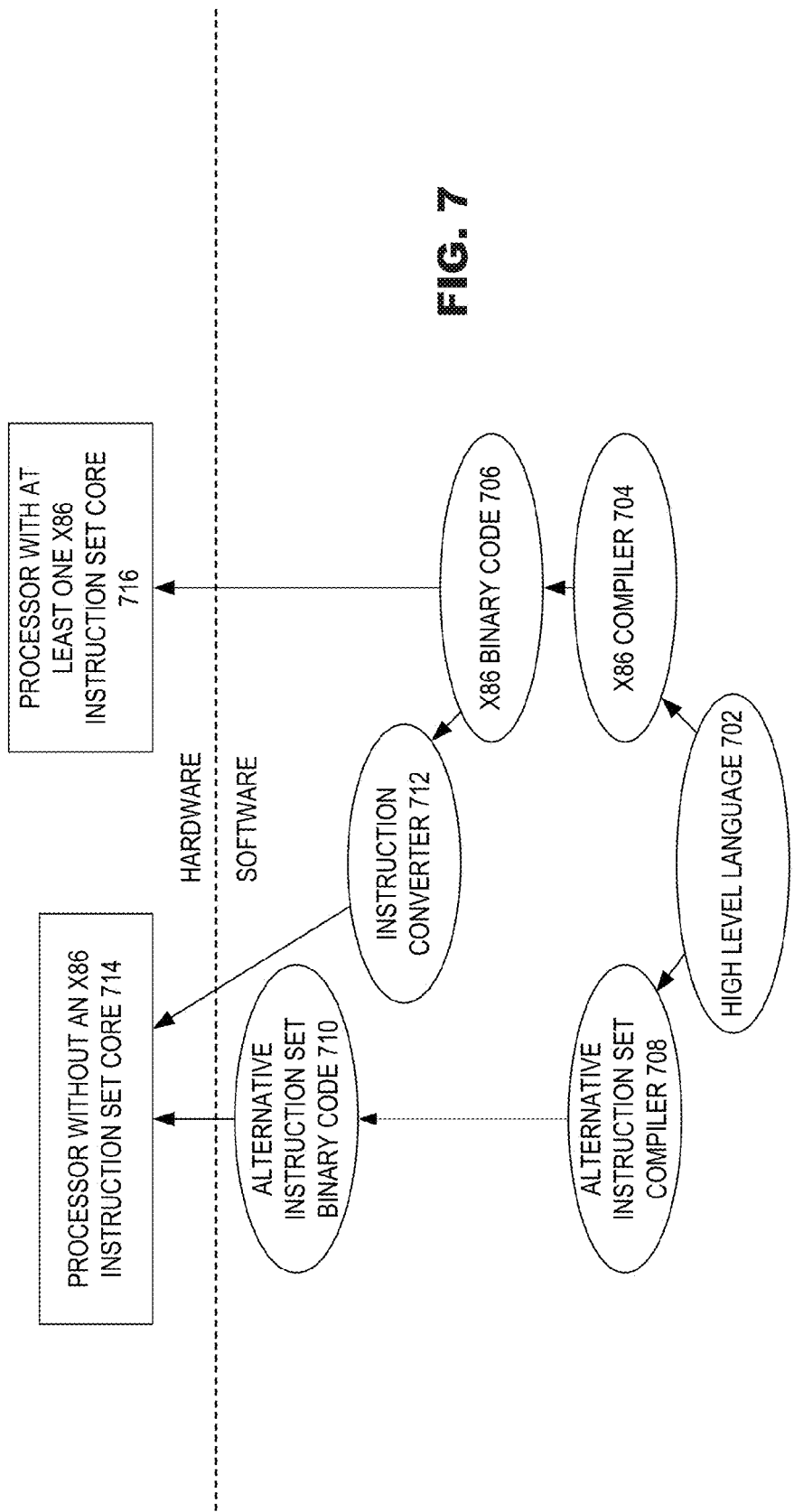
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Distributed Snoop Filtering

Since lines cached in the core may not be present in the NI LLC, additional snoop filtering capabilities are required to ensure core cache and interconnect bandwidth is not inundated by snoops. One possible way of doing this, for example, is to have a separate completely inclusive snoop filter at the LLC hierarchy level that stores the cache tag for every cache line in the lower caches and associated information of which core the line may be in.

The embodiments of the invention include a distributed snoop filtering structure for the NI LLC optimized for the core cache hierarchy found in current processor architectures (e.g., such as the Intel Core® processors). The Snoop Filter (SF) efficiency-to-size ratio is greatly improved by having accurate information of which lines are cached in the cores at any given time. In one embodiment of the NI LLC scheme, the primary snoop filter (hereinafter simply "snoop filter" or "SF") is exposed to almost all MLC victims (sent to the LLC) and thus has a reasonably accurate picture of the MLC. The L1 cache, however, may still continue to hold lines victimized by the MLC, thus decreasing the accuracy of the SF. To address this issue, one embodiment of the invention distributes the snoop filtering responsibility between (1) an independent snoop filter which tracks only MLC-cached lines and (2) the NI LLC which includes additional bits in a tag managed by the NI LLC to track whether cache lines still may be present in a core's L1 cache. The additional logic in the NI LLC is sometimes referred to below as the "NI LLC snoop filter."

One embodiment of the invention will be described with respect to FIG. 9A, which illustrates an exemplary processor with six cores 901-906, each having a dedicated L1 cache 911-916, respectively. The cores are logically grouped such that certain cores share an MLC 921-923. For example, cores 901-902 share MLC 921; cores 903-904 share MLC 922; and cores 905-906 share MLC 923. FIG. 9B illustrates an another embodiment in which each core 901-906 has both a dedicated (non-shared) L1 cache 911-912 and MLC 921-926, respectively. While these specific embodiments are shown for the sake of explanation, the underlying principles of the invention are not limited to any particular arrangement of the L1 caches and MLCs within the cores 901-906. Moreover, while 6 cores 901-906 are illustrated in FIGS. 9A-B, the underlying principles of the invention are not limited to any particular number or type of cores.

Figure 9A:
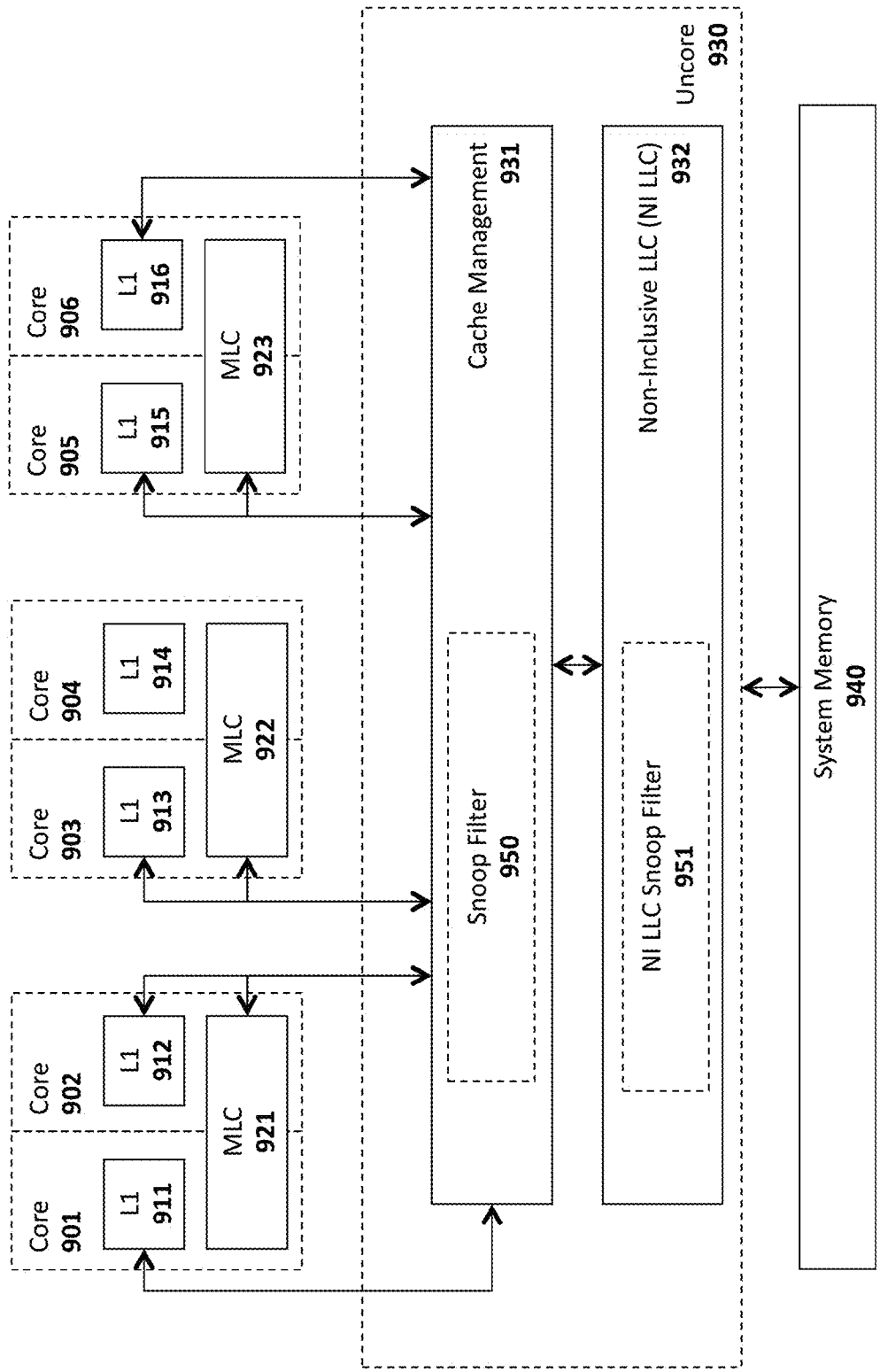
FIGS. 9A-B illustrate different system architectures in accordance with different embodiments of the invention.
Figure 9B:
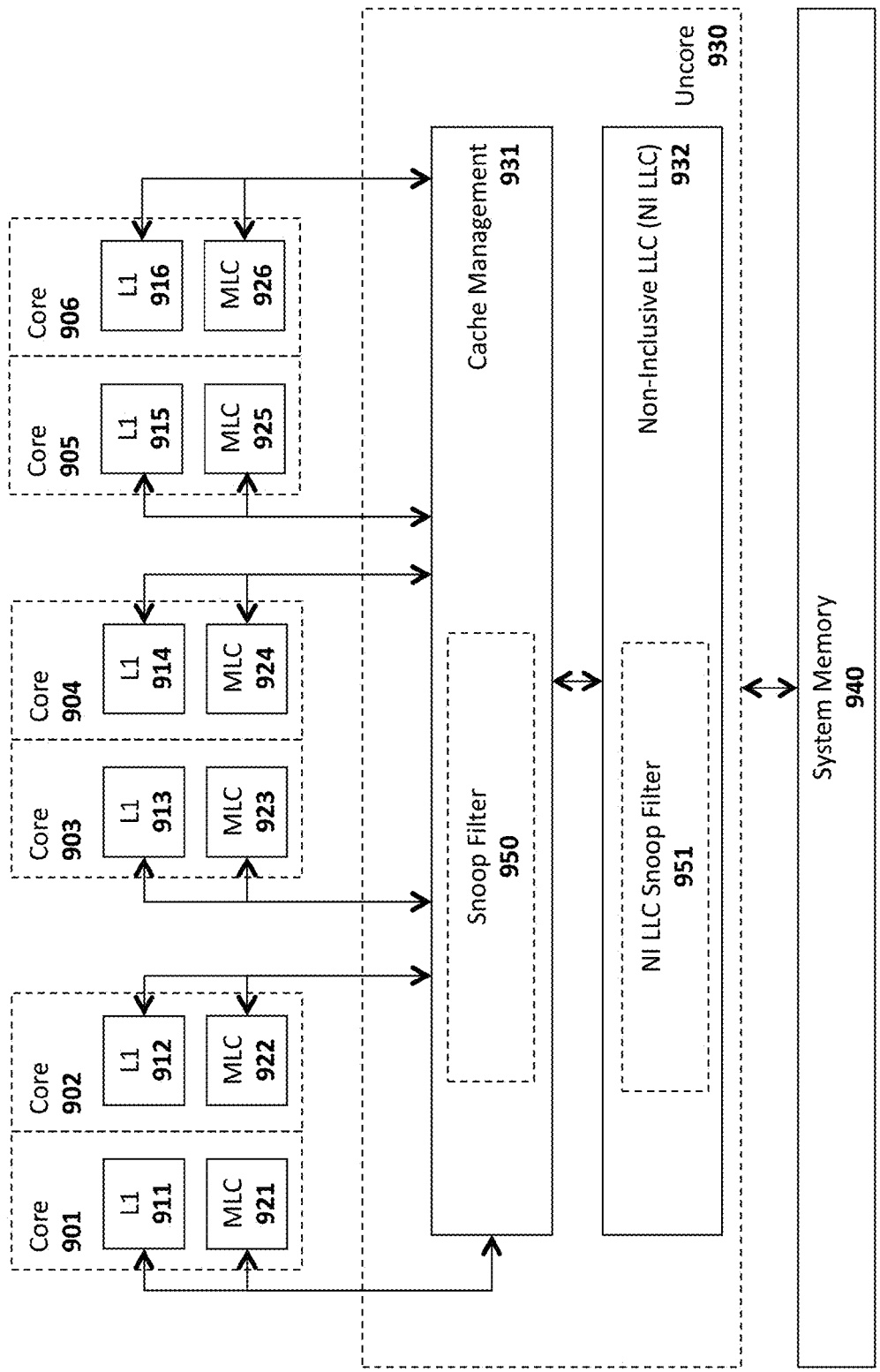

An "uncore" component 930 illustrated in FIGS. 9A-B provides for inter-core/inter-module communication and also includes a cache management component 931 with a snoop filter 950 and a non-inclusive LLC 932 with an NI LLC snoop filter 951. As mentioned, in one embodiment, the snoop filtering responsibility is distributed between the snoop filter 950 of the cache management component 931 and the NI LLC snoop filter 951 to implement a non-inclusive cache hierarchy (as described in detail below). Additionally, the uncore component 930 may include various other well known components such as interconnect (e.g., a quick path interconnect (QPI)) or other suitable type of interconnect to couple the cores 901-906 (including the caches) to a system memory 940 and other system components.

In one embodiment, the non-inclusive (NI) LLC 932 is a victim cache for the MLC 921-926. This means that the NI LLC 932 will get filled by clean or dirty lines that are evicted out of the MLCs 921-926 in the processor cores 901-906. In one embodiment, when a cache line requested by a core is brought in from memory 940 it will only be filled into the L1 911-916 and MLC 921-926, but not the NI LLC 932. The NI LLC snoop filter 951 may make the NI LLC 932 and MLCs 921-926 exclusive of each other. However, since lines evicted from the MLC 921-926 may continue to be cached in the L1 911-916, the NI LLC 932 may contain lines still present in the L1.

The embodiments of the invention include techniques to achieve snoop filtering for sending snoops to core caches in this scenario. The embodiments shown in FIGS. 9A-B, for example, have a primary snoop filter structure 950, but also utilize a NI LLC snoop filter 951 which manages core valid bits in the LLC tag which adds to the snoop filtering ability.

Figure 9C:
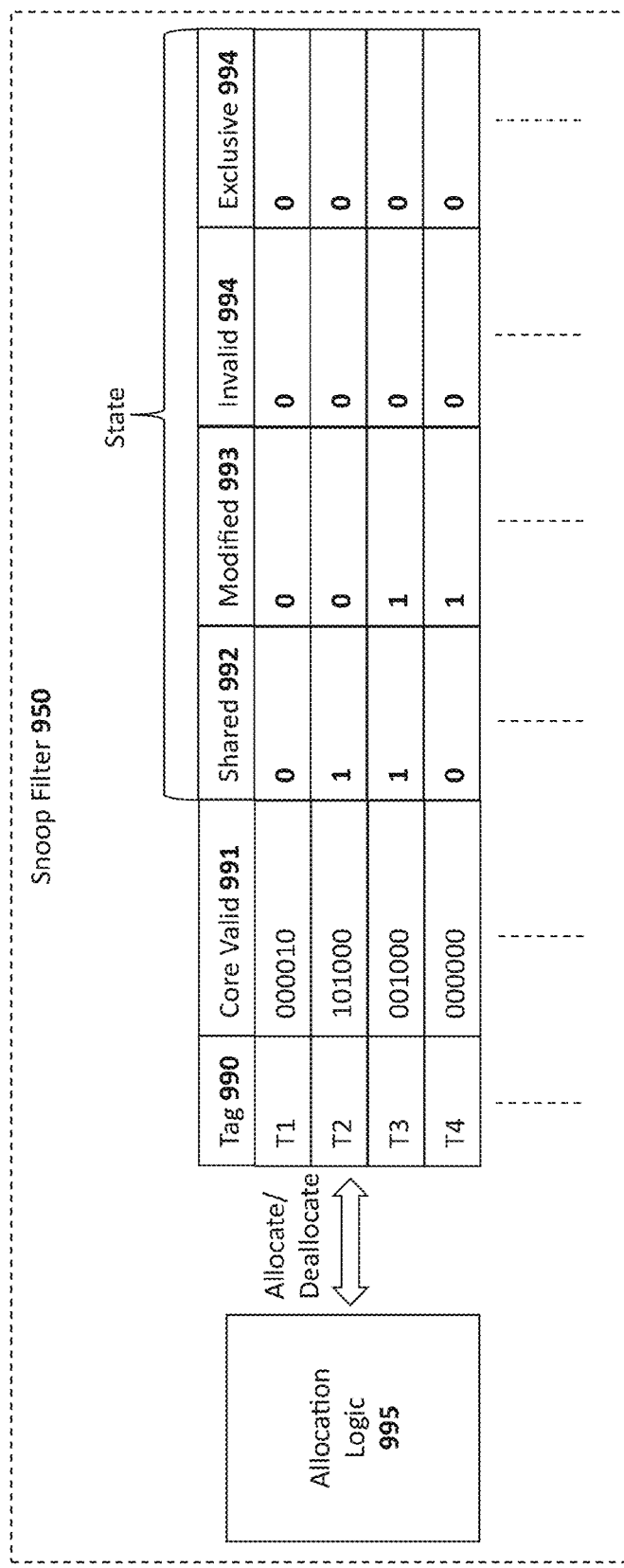
FIG. 9C illustrates a snoop filter in accordance with one embodiment of the invention.
Figure 9D:
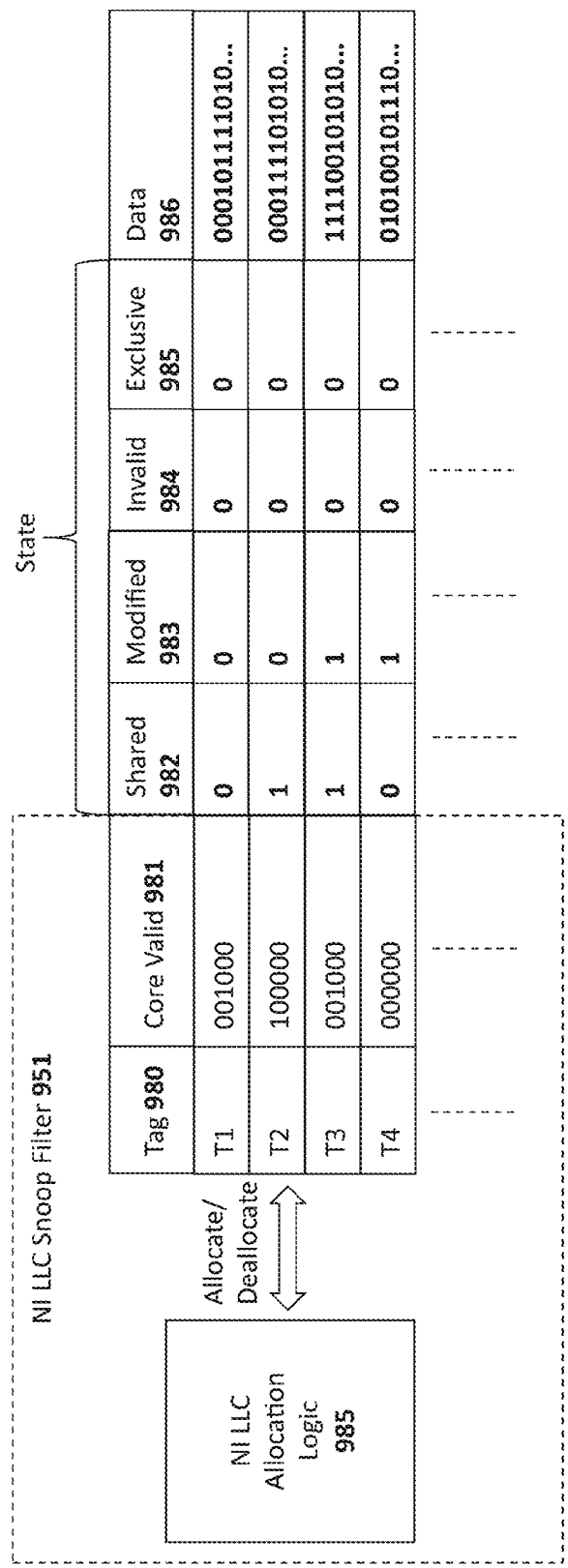
FIG. 9D illustrates a non-inclusive last level cache (NI LLC) including a snoop filter in accordance with one embodiment of the invention.

FIG. 9C provides additional details of one embodiment of the snoop filter 950 and FIG. 9D provides additional details of one embodiment of the NI LLC snoop filter. As illustrated in FIG. 9C the snoop filter structure 950 may be implemented like a cache which contains the address tag 990, cache state information 992-994, core valid bits 991 and allocation logic 995 to implement a cache line replacement policy (e.g., such as least recently used (LRU) or other line replacement policy). In one embodiment, the tag 990 may be implemented in a typical manner (e.g., using a specified portion of the address associated with the cache line). The core valid bits 991, set for every line, indicate which core the line may be present in. In the illustrated example, each of 6 different bits may be set to indicate which of the 6 cores may have a copy of the cache line (e.g., with a value of 1 indicating that the corresponding core has the line).

The state information 992-994 may be managed using standard cache coherency techniques. In the specific example shown in FIG. 9C, the MESI (Modified, Exclusive, Shared Invalid) protocol is implemented and a separate bit is set to indicate the Modified state 993, the Exclusive state 994, the Shared state 992, and the Invalid state 994. However, the underlying principles of the invention are not limited to any particular cache coherency protocol. Various other coherency protocols may be used such as MOESI (which includes the Owned state), MOSI, and MESIF (which includes the Forward state), to name just a few. Note that, in the embodiment shown in FIG. 9C, the snoop filter 950 does not store the actual data for each cache line.

As illustrated in FIG. 9D, in one embodiment, the NI LLC snoop filter 951 may be implemented by adding core valid bits 981 to each cache line to identify the L1 cache(s) in which the line is present (e.g., with a 1 in a particular bit position indicating the presence of the line in the L1 cache associated with that bit position). The core valid bits 981 may be added to the cache tag 980, even though they are illustrated as separate entities in FIG. 9D. The other information maintained in each cache line may include state information 982-985 (as described above with respect to FIG. 9C) and the actual cache line data 986, as in a typical LLC. The NI LLC allocation logic 985 allocates and deallocates cache lines to and from the NI LLC 932, respectively, using the techniques described herein.

In one embodiment, the allocation logic 995 allocates a line to the snoop filter 950 when the line is brought in from memory 940 in response to a core request. The allocation logic 995 may de-allocate lines from the snoop filter when (1) any MLC 921-926 evicts a line causing a writeback to memory and/or (2) the snoop filter 950 requires the line to be victimized due to a miss to allow for the new line to be brought in. As mentioned above, various different cache line replacement policies may be implemented such as least recently used (LRU).

In the NI LLC 932, almost all MLC evictions will lead to writebacks. Any new line requested will need space be allocated in both the MLC 921-926 and the snoop filter 950. Thus, MLC eviction usually ensures that there will be space in the snoop filter 950 to accommodate most new lines without requiring the allocation logic 995 to victimize an existing snoop filter 950 line. Consequently, the snoop filter 950 can track the entire MLC efficiently if it is sized similarly to the MLC or somewhat larger to account for temporal imbalances in request address patterns for set and hash distributions (in a distributed SF/LLC structure).

The above is facilitated by the fact that, in one embodiment, the NI LLC 932 continues to track cache lines left behind in the core L1 caches on MLC evictions. In particular, in one embodiment, the NI LLC allocation logic 985 allocates lines to the NI LLC 932 which are evicted from the MLC 921-926. In addition, NI LLC allocation logic 985 may update the core valid bits 981 for those evictions that leave behind L1 lines or are shared by other core MLCs (i.e., to indicate the presence of the lines in those caches). The increase in NI LLC size for this is only due to the few core valid bits 981 per entry—much less than the size of the entire tag that would be required if the snoop filter 950 exclusively owned all snoop filtering responsibilities. The NI LLC snoop filter 951 may continually update the core valid bits 981 and the snoop filter 950 may continually update the core valid bits 991 by snooping the bus to track whether a cache line is stored in the MLCs and/or L1 caches.

Figure 10:
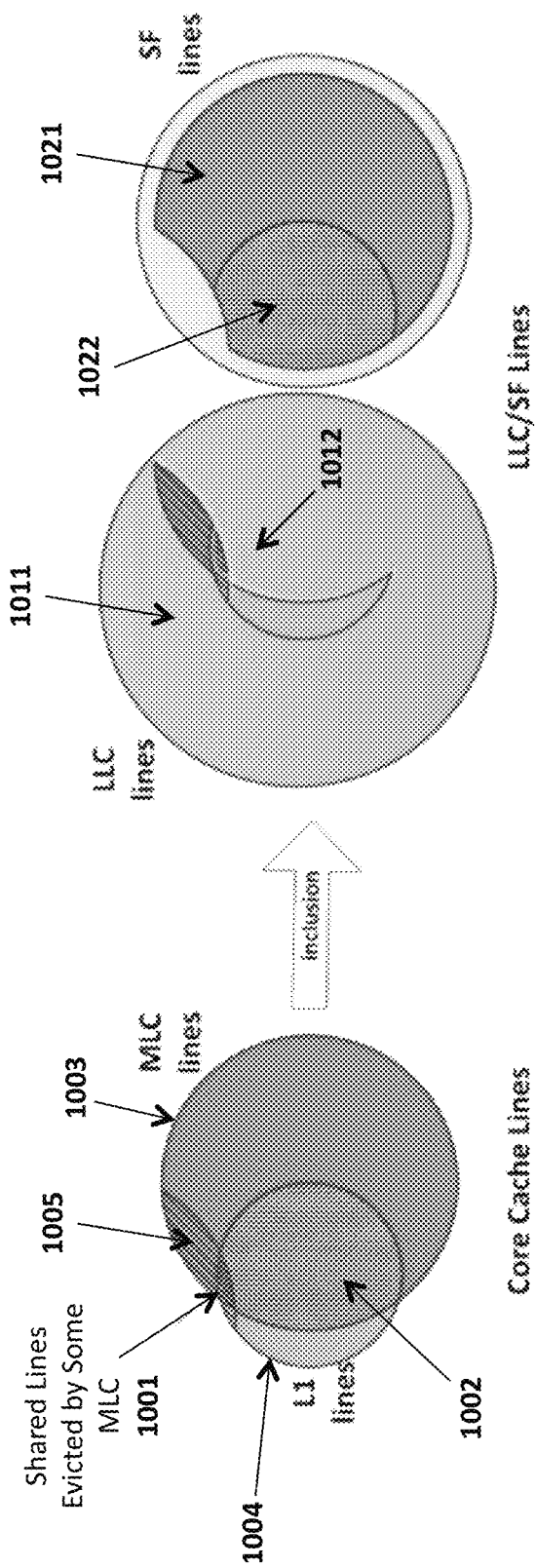
FIG. 10 graphically illustrates MLC cache lines which are managed by the snoop filter (SF) and cache lines which are managed by the NI LLC snoop filter.

The distribution of inclusion and snoop filtering responsibilities between the NI LLC snoop filter 951 and the snoop filter 950 is shown in FIG. 10 for one embodiment of the invention. All MLC lines are represented by circle 1003 and all L1 lines are represented by circle 1004. The overlap between the circles 1002 represents cache lines in both an MLC and a L1 cache. The shaded region (1005, 1001, etc) represents shared lines that have been evicted by one core's MLC, but continue to be present in another core's MLC, or the L1, or both. Region 1005 represents the other core's MLC only and region 1001 is in the MLC of other cores and the L1 in the same or another core.

Circle 1011 represents all NI LLC lines. As indicated by region 1012, in one embodiment, all of the evicted MLC cache lines, including those which are stored in the L1 cache, and all L1 lines which are not also stored in an MLC will be stored in the NI LLC in accordance with the cache line management policies described herein. In addition, following eviction, the snoop filter lines may include the portion of the MLC lines still stored in the MLC 1021, including the portion which are also stored in the L1 cache 1022.

In one embodiment, any snoop filter eviction may also bring the corresponding core line into the NI LLC. Since the NI LLC continues to track these lines in the core, the lines need not be removed from the core cache. The NI LLC may continue to maintain the state 982-985 of these lines (e.g., in the same state or a downgraded state). In one embodiment, only an NI LLC eviction requires the corresponding line in any core cache to be removed. In some implementations, it will be infrequent for the NI LLC to have the core valid bits set since (1) snoop filter evictions are rare as described above, (2) the usually much smaller L1 retaining MLC evicted lines is also rare, and (3) shared lines are much less frequent than private ones.

Using the embodiments of the invention described herein, the low likelihood of snoop filter evictions, or back-snoops due to LLC evictions leads to lower inclusion victims and also low consumption of snoop bandwidth towards the core due to evictions. In addition, there is a two stage eviction before any line is removed from the cache hierarchy. First, it must be evicted by either the MLC or snoop filter and then again evicted by the LLC, thereby compensating for LRU inefficiencies.

Figure 11:
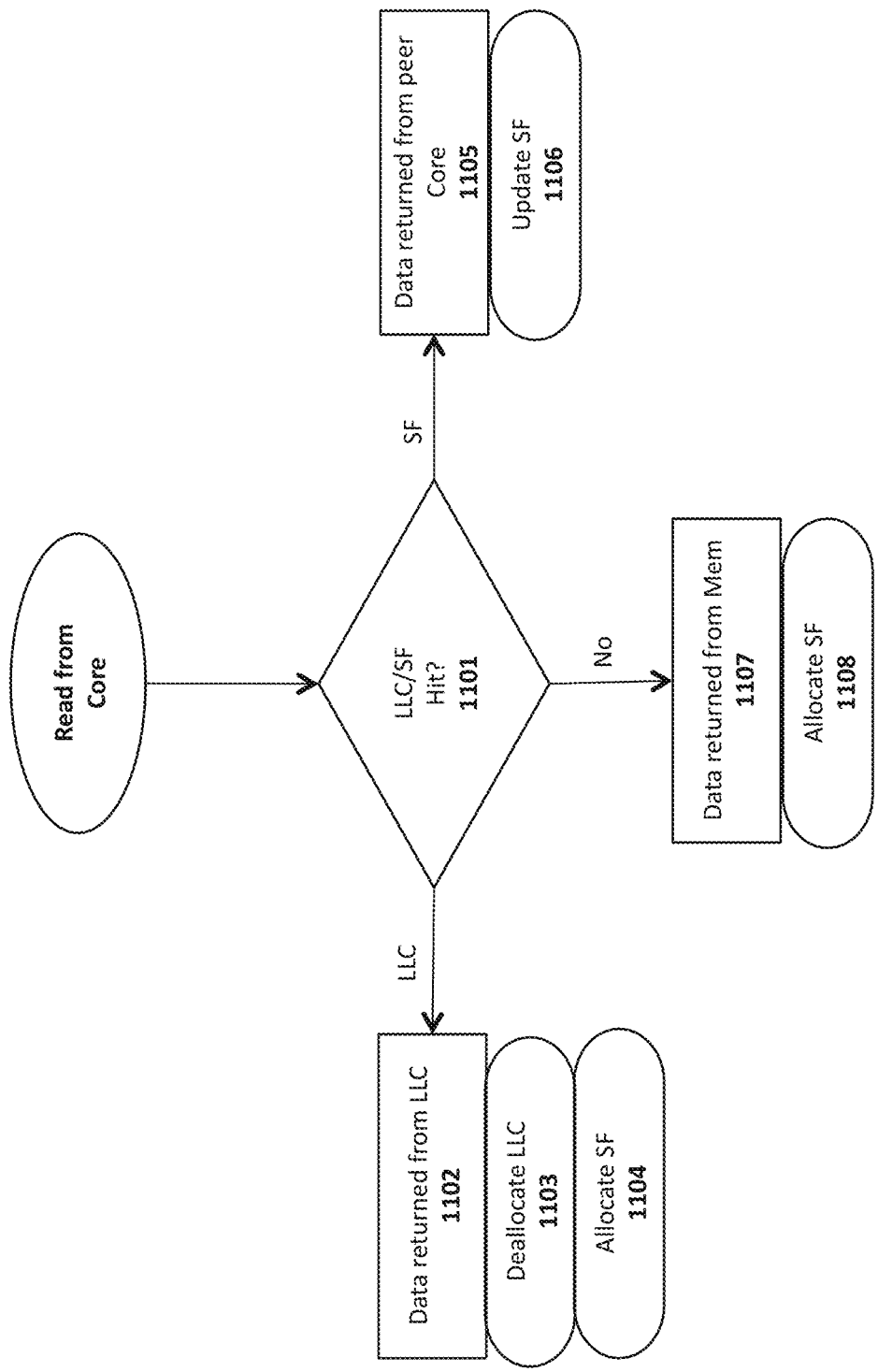
FIG. 11 illustrates one embodiment of a method for processing a read request from a core.

One embodiment of the allocation and de-allocation operations performed by the allocation logic 985 in the NI LLC and allocation logic 995 in the snoop filter are shown in FIGS. 11-14. Turning first to FIG. 11, in response to a read operation from a core, at 1101 a determination is made as to whether the requested cache line is stored in the NI LLC 932 or the snoop filter 950. If stored in the NI LLC 932, then the data is returned from the NI LLC at 1102. The line is then de-allocated form the LLC at 1103 and allocated in the snoop filter at 1104 (since it will now be present in the MLC).

If there is a hit to the snoop filter at 1101, then at 1105, the requested data is returned from a peer core (e.g., identified using the core valid bits 991) and, at 1106, the snoop filter is updated to reflect the new location of the cache line (e.g., by updating the core valid bits 991).

If the requested cache line is not found in either the LLC or the snoop filter at 1101, then at 1107, the requested cache line is returned from memory and, at 1108, the snoop filter is updated to reflect the presence of the new cache line.

Figure 12:
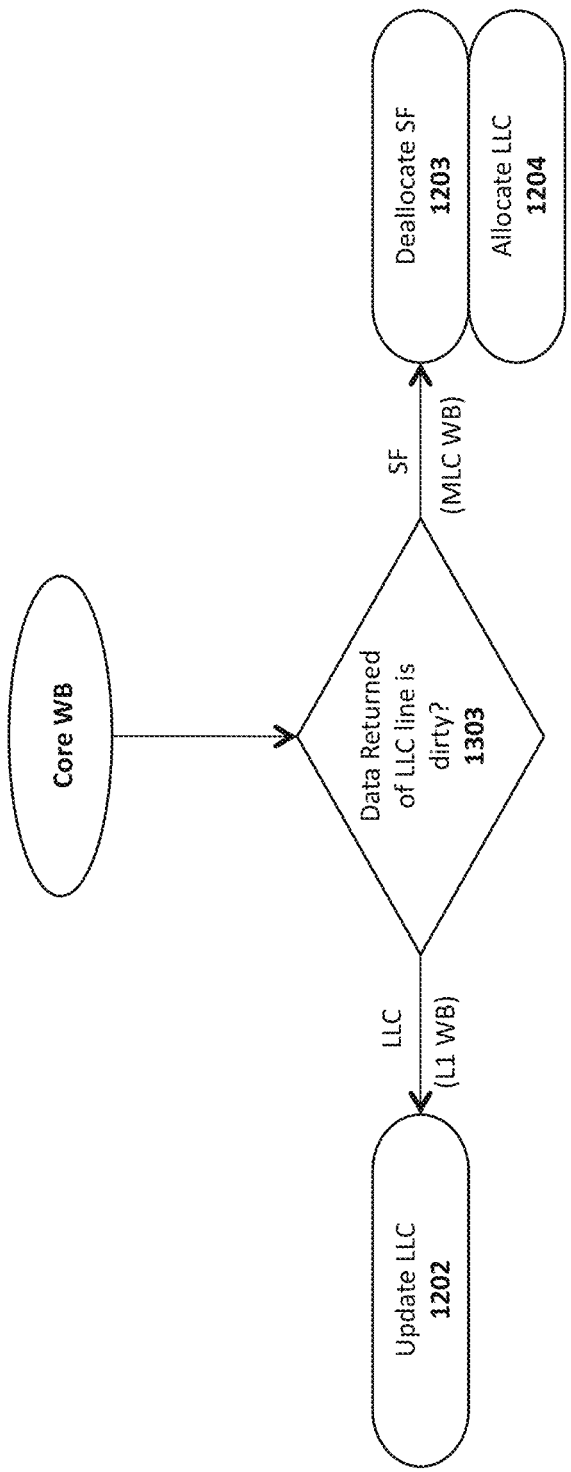
FIG. 12 illustrates one embodiment of a method for performing a writeback operation.

FIG. 12 illustrates a series of operations performed in response to a writeback from a core (i.e., in which one or more cache lines are written back to memory). In response to a hit to the NI LLC (e.g., a L1 writeback), determined at 1201, the NI LLC is updated at 1202 (i.e., to include the updated data in the cache line being written back to memory).

In response to a hit to the snoop filter at 1201 (e.g., an MLC writeback), the cache line is deallocated from the snoop filter at 1203 and the cache line is allocated to the NI LLC at 1204.

Figure 13:
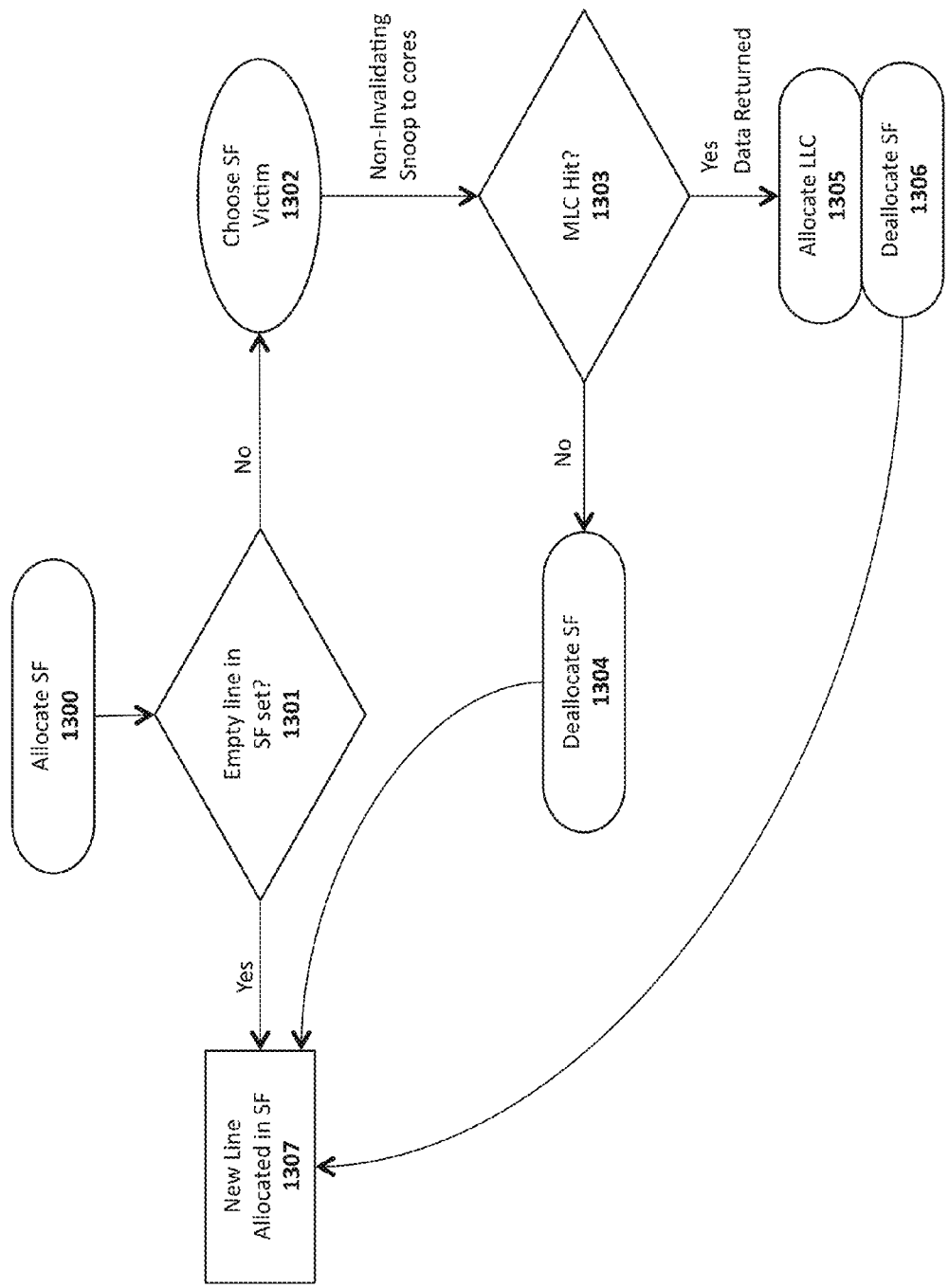
FIG. 13 illustrates one embodiment of a method for allocating a new line in the snoop filter.

FIG. 13 illustrates one embodiment of a method for allocating a new line in the snoop filter. In response to an operation which requires an allocation of a new snoop filter line at 1300, a determination is made at 1301 as to whether an empty line is available (e.g., a line which has recently been invalidated). If so, then the new line is allocated at 1307. If not, then a victim line is selected at 1302. As mentioned, various cache management policies may be implemented to select a victim line such as least recently used (LRU) (i.e., selecting that line for which the longest amount of time has passed since a prior access). Once the line has been selected, a determination is made at 1303 as to whether the line is present in the MLC. This may be determined by the snoop filter performing a non-invalidating snoop to the cores. If the cache line is not present in the MLC, then at 1304, the entry associated with the cache line is de-allocated from the snoop filter and the new line is allocated at 1307. In response to an MLC hit at 1303, the evicted line is allocated to the NI LLC at 1305 and is de-allocated from the snoop filter at 1306.

Figure 14:
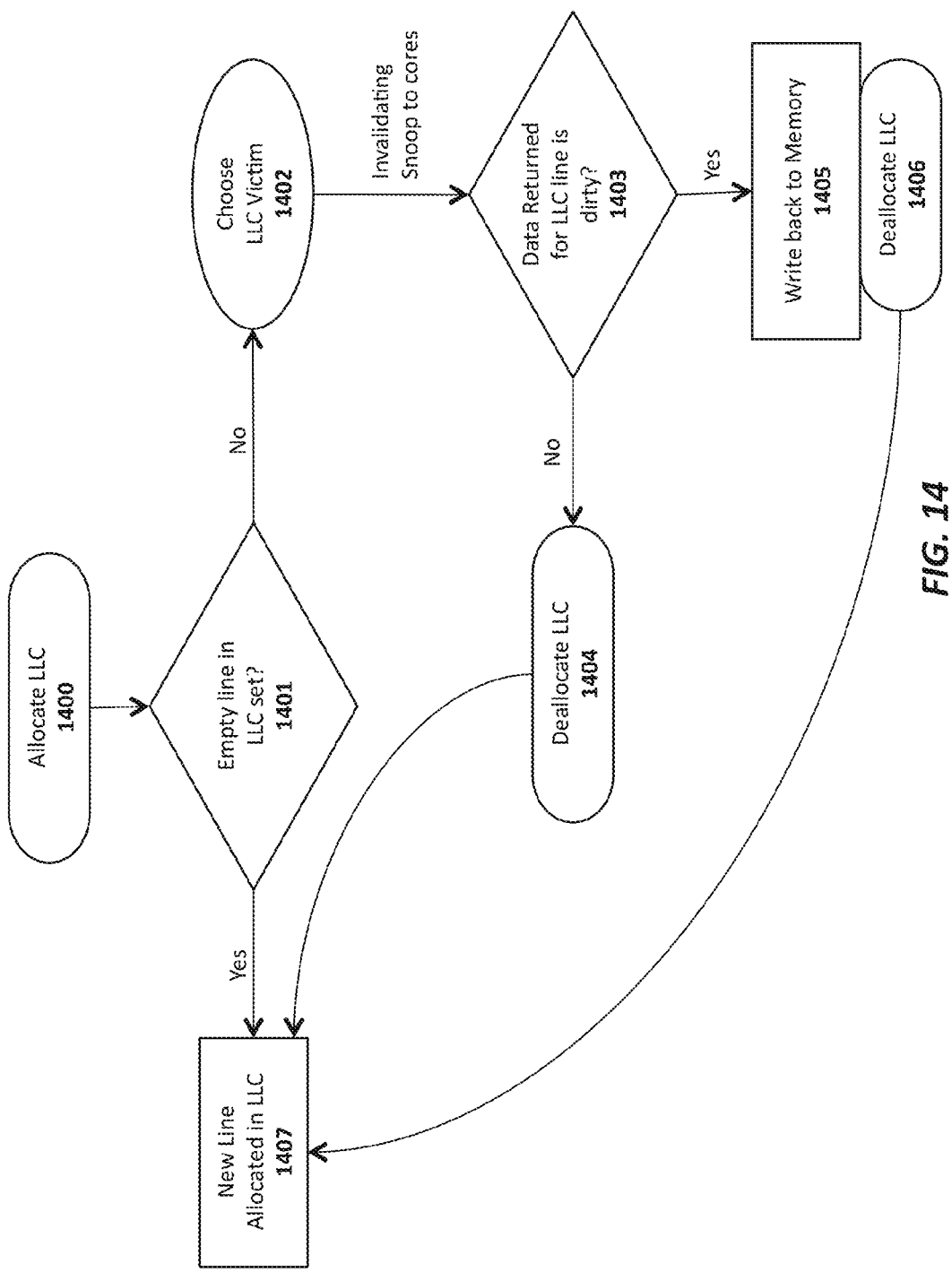
FIG. 14 illustrates one embodiment of a method for allocating a new line in the NI LLC.

FIG. 14 illustrates one embodiment of a method for allocating a new cache line in the NI LLC. If an empty line is available, determined at 1401, then the new line is allocated at 1407. If not, then at 1402 a victim line is selected (e.g., using LRU or other cache line replacement policy as discussed above). Upon selecting the victim, an invalidating snoop is sent out to the cores. If data is returned and/or if the NI LLC line is dirty, determined at 1403, then at 1405, the data is written back to memory. In either case, at 1406 or 1404, the cache line is de-allocated from the NI LLC.

CPU developers in the SoC space for both client and servers, especially micro-servers, are increasingly facing die area and power limitations. Most already use a non-inclusive cache hierarchy to maximize caching efficiency. The embodiments of the invention are beneficial because they provide a significantly improved balance of snoop filter size and efficiency.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a plurality of cores to execute instructions and process data;
   first snoop hardware logic to track a first plurality of cache lines stored in a mid-level cache ("MLC") accessible by one or more of the cores, the first snoop logic to allocate entries for cache lines stored in the MLC and to deallocate entries for cache lines evicted from the MLC, wherein at least some of the cache lines evicted from the MLC are retained in a level 1 (L1) cache; and
   second snoop hardware logic to track a second plurality of cache lines stored in a non-inclusive last level cache (NI LLC), the second snoop logic to allocate entries in the NI LLC for cache lines evicted from the MLC and to deallocate entries for cache lines stored in the MLC, wherein the second snoop logic is to store and maintain a first set of core valid bits to identify cores containing copies of the cache lines stored in the NI LLC;
   wherein the first set of core valid bits identify cache lines which are stored both in the NI LLC and in L1 caches of cores identified by the core valid bits.

2. The processor as in claim 1 wherein the first snoop hardware logic and second snoop hardware logic are each to store entries indicating a current state of each cache line.

3. The processor as in claim 2 wherein the current state is to be maintained as a set of state bits including a shared bit, a modified bit, an invalid bit and an exclusive bit.

4. The processor as in claim 3 wherein the first snoop hardware logic is to maintain a second set of core valid bits to identify cores in which the cache lines are currently stored.

5. The processor as in claim 1 wherein in response to a read operation generated by a first core, the first snoop hardware logic is to determine whether a cache line containing data for the read operation is stored in a peer core, wherein if the first snoop hardware logic identifies the cache line containing the data in a peer core, then the data is to be returned from the peer core.

6. The processor as in claim 5 wherein the second snoop hardware logic is to determine whether a cache line containing data for the read operation is stored in the NI LLC, wherein if the cache line containing data for the read operation is stored in the NI LLC, the data is returned to the MLC of the first core and a cache line containing data for the read operation is deallocated from the NI LLC.

7. The processor as in claim 1 wherein in response to a writeback operation generated by a first core, the first snoop hardware logic is to deallocate an entry for a cache line stored in the MLC and the second snoop hardware logic is to allocate an entry for a cache line stored in the NI LLC, the entry in the NI LLC corresponding to the data contained in the writeback operation.

8. The processor as in claim 1 wherein in response to a writeback operation generated by a first core in which a cache line corresponding to the writeback operation is not present in a MLC but is present in the NI LLC, the second snoop hardware logic to update the NI LLC to contain new data associated with the writeback operation.

9. The processor as in claim 1 wherein to allocate a new entry, the first snoop hardware logic is to select a victim entry based on an entry management policy and, once selected, to determine whether a cache line corresponding to the victim entry is stored in the MLC and, if so, the second snoop hardware logic to allocate an entry for the cache line corresponding to the victim entry in the NI LLC.

10. The processor as in claim 9 wherein the victim management policy comprises a least recently used (LRU) policy.

11. The processor as in claim 1 wherein to allocate a new entry, the second hardware snoop logic is to select a victim entry based on an entry management policy and, once selected, to perform an invalidating snoop to cores containing a cache line corresponding to the victim entry, wherein if a core contains a dirty cache line corresponding to the victim entry, then the dirty cache line to be written back to memory.

12. A method comprising:
    tracking a first plurality of cache lines stored in a mid-level cache ("MLC") of one or more cores by first snoop hardware logic, the first snoop hardware logic to allocate entries for cache lines stored in the MLC and to deallocate entries for cache lines evicted from the MLC, wherein at least some of the cache lines evicted from the MLC are retained in a level 1 (L1) cache; and
    tracking a second plurality of cache lines stored in a non-inclusive last level cache (NI LLC), the second snoop hardware logic to allocate entries in the NI LLC for cache lines evicted from the MLC and to deallocate entries for cache lines stored in the MLC, wherein the second snoop hardware logic is to store and maintain a first set of core valid bits to identify cores containing copies of the cache lines stored in the NI LLC;
    wherein the first set of core valid bits identify cache lines which are stored both in the NI LLC and in L1 caches of cores identified by the core valid bits.

13. The method as in claim 12 wherein the first snoop hardware logic and second snoop hardware logic are each to store entries indicating a current state of each cache line.

14. The method as in claim 13 wherein the current state is to be maintained as a set of state bits including a shared bit, a modified bit, an invalid bit and an exclusive bit.

15. The method as in claim 14 wherein the first snoop hardware logic is to maintain a second set of core valid bits to identify cores in which the cache lines are currently stored.

16. The method as in claim 12 wherein in response to a read operation generated by a first core, the first snoop hardware logic is to determine whether a cache line containing data for the read operation is stored in a peer core, wherein if the first snoop hardware logic identifies the cache line containing the data in a peer core, then the data is to be returned from the peer core.

17. The method as in claim 16 wherein the second snoop hardware logic is to determine whether a cache line containing data for the read operation is stored in the NI LLC, wherein if the cache line containing data for the read operation is stored in the NI LLC, the data is returned to the MLC of the first core and a cache line containing data for the read operation is deallocated from the NI LLC.

18. The method as in claim 12 wherein in response to a writeback operation generated by a first core, the first snoop hardware logic is to deallocate an entry for a cache line stored in the MLC and the second snoop hardware logic is to allocate an entry for a cache line stored in the NI LLC, the entry in the NI LLC corresponding to the data contained in the writeback operation.

19. The method as in claim 12 wherein in response to a writeback operation generated by a first core in which a cache line corresponding to the writeback operation is not present in a MLC but is present in the NI LLC, the second snoop hardware logic to update the NI LLC to contain new data associated with the writeback operation.

20. The method as in claim 12 wherein to allocate a new entry, the first snoop hardware logic is to select a victim entry based on an entry management policy and, once selected, to determine whether a cache line corresponding to the victim entry is stored in the MLC and, if so, the second snoop hardware logic to allocate an entry for the cache line corresponding to the victim entry in the NI LLC.

21. The method as in claim 20 wherein the victim management policy comprises a least recently used (LRU) policy.

22. The method as in claim 12 wherein to allocate a new entry, the second snoop hardware logic is to select a victim entry based on an entry management policy and, once selected, to perform an invalidating snoop to cores containing a cache line corresponding to the victim entry, wherein if a core contains a dirty cache line corresponding to the victim entry, then the dirty cache line to be written back to memory.

* * * * *